July 31, 1923.
J. T. PEDERSÉN
1,463,589
PROCESS OF ADJUSTING MEASURING MACHINES
Filed Dec. 9, 1919
3 Sheets—Sheet 1
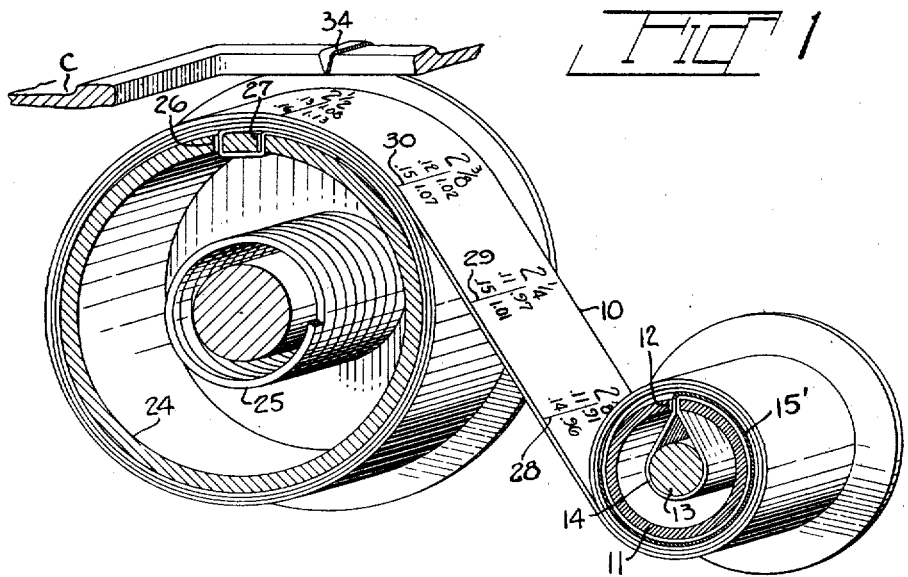
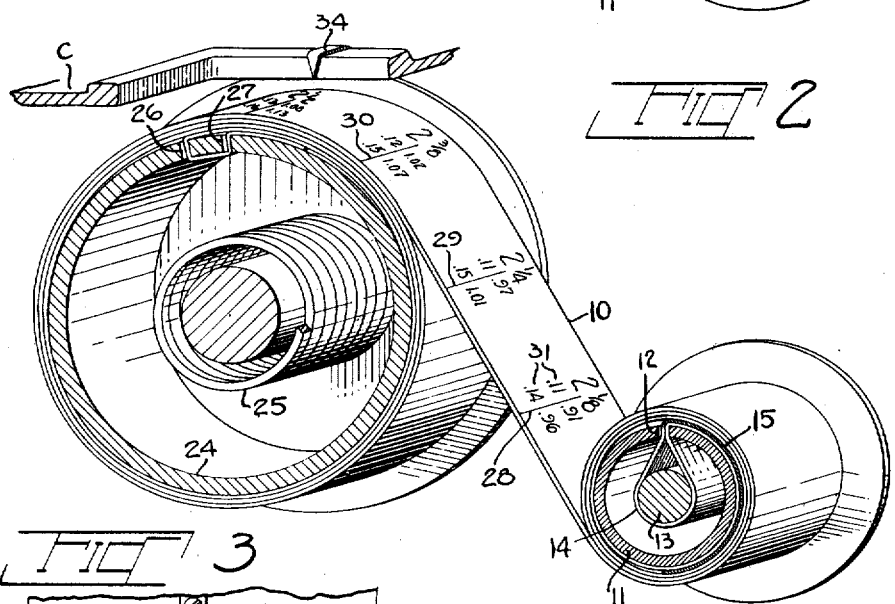
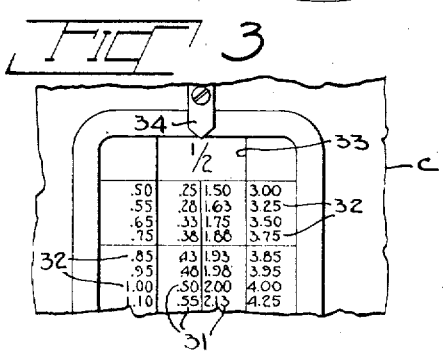
INVENTOR
Johannes T. Pedersén
BY
H. H. Dyke
ATTORNEY

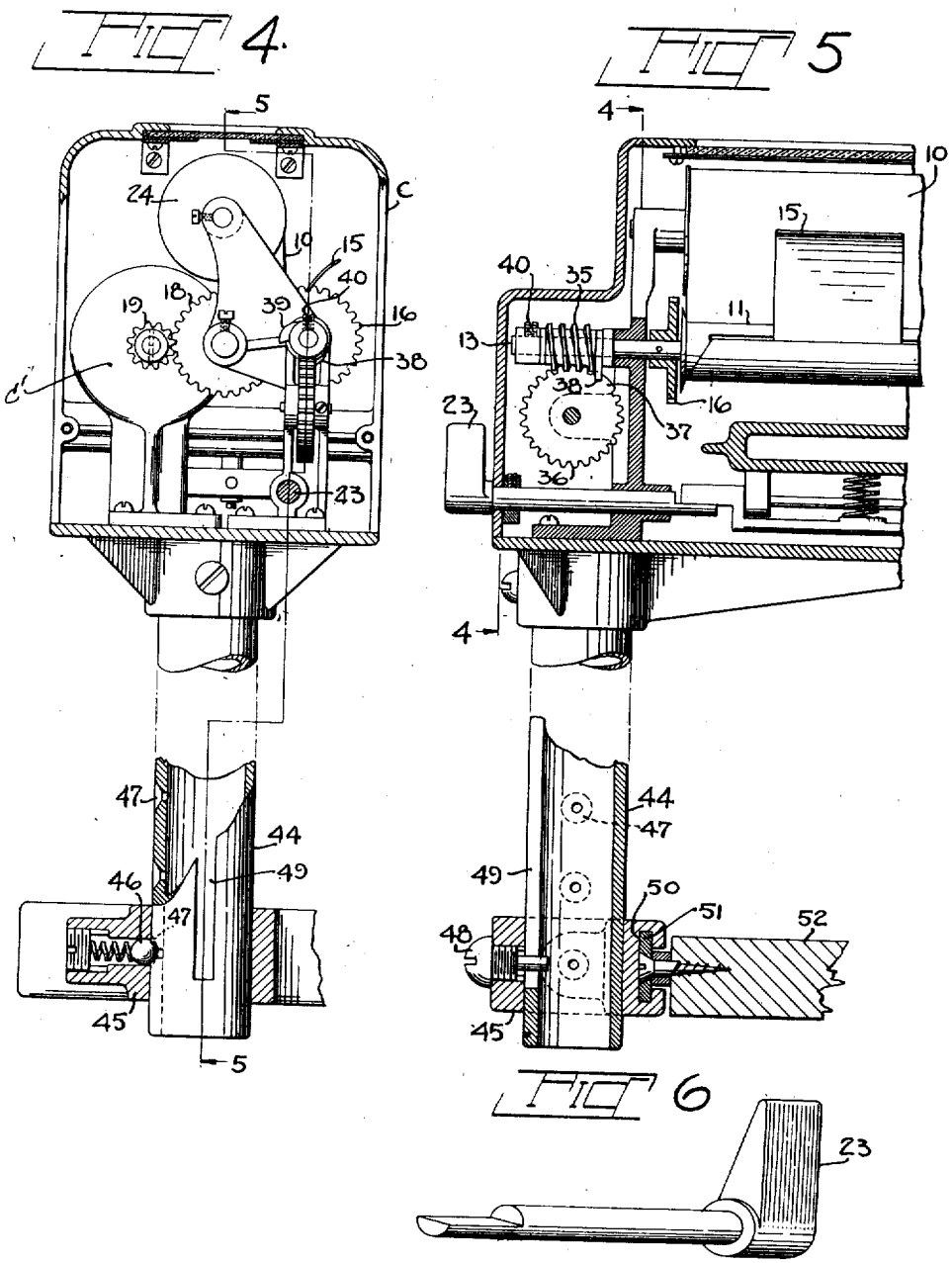

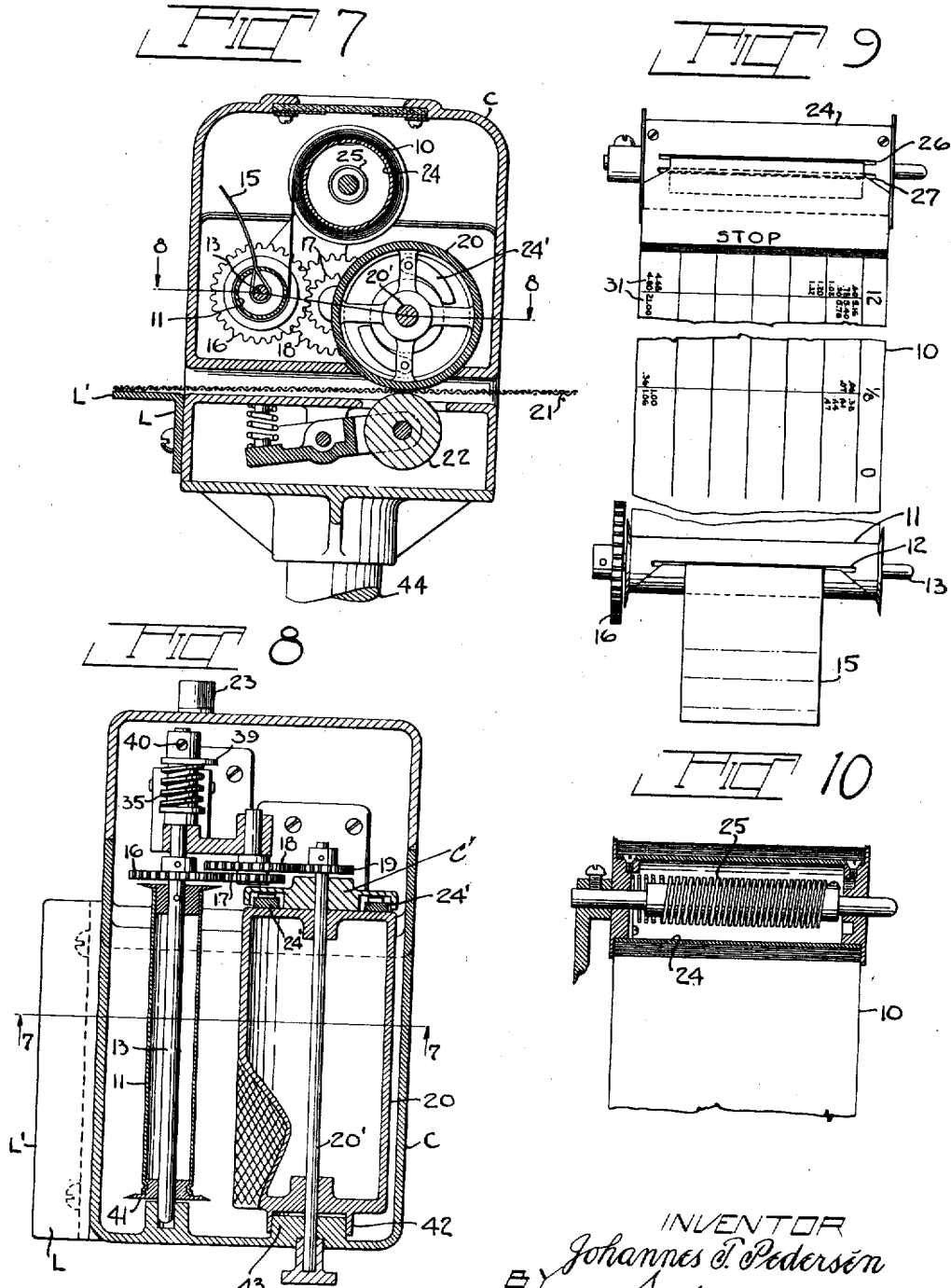

Patented July 31, 1923.

UNITED STATES PATENT OFFICE.

1,463,589

JOHANNES TH. PEDERSĕN, OF FLUSHING, NEW YORK, ASSIGNOR, BY MESNE ASSIGNMENTS, TO THE MEASUREGRAPH COMPANY, A CORPORATION OF MISSOURI.

PROCESS OF ADJUSTING MEASURING MACHINES.

Application filed December 9, 1919. Serial No. 343,635.

*To all whom it may concern:*

Be it known that I, JOHANNES T. PEDERSĕN, a citizen of the United States, and a resident of Flushing, county of Queens, and State of New York, have invented certain new and useful Improvements in Processes of Adjusting Measuring Machines, of which the following is a specification.

My invention relates to a process of adjusting measuring machines such as are used for measuring or metering cloth, ribbons and other goods.

In a common type of measuring machines, the fabric or cloth to be measured is passed between two rollers including a presser roller which presses the fabric against the face of the other roller which operates as a measuring roller, and is of a predetermined diameter; its rotation is communicated to a take-up roller which draws the chart from a supply roller carrying a tension spring. During the measuring movement the numbers on the chart are presented at a reading point where a fixed pointer may be located. These numbers on the chart may indicate merely the length of the piece of fabric measured, or they may be computed numbers and indicate charges to be made for the amount of fabric which the machine has measured. Although the actual diameter of the take-up roller itself may be accurately determined, it is obvious that the effective diameter of the roll upon which the chart is winding, constantly changes as successive layers of the chart are wound upon it. If the chart of such a machine is properly calibrated for a certain kind of paper chart, and for a certain tension of the tension spring of the supply roller, it will be evident that variations in the thickness of the paper stock used for making the charts of the machines, or variations in the tension of the spring, would tend to produce inaccuracies in the measurements indicated by the machines, for example, if a thinner paper were substituted for that which formerly had been used in making these charts, the effective diameter of the take-up roller would be decreased and the machine would have a corresponding error in its indication, and indicate less than the amount actually measured, that is to say, it would have a minus error. The general object of my invention is to provide a simple process for overcoming this difficulty in such a way as to enable the effective diameter of the take-up roller to be nicely adjusted to suit the special requirements of the paper being used for the chart, or the particular machine being adjusted.

Further objects of the invention will appear hereinafter.

The invention consists in those acts to be described hereinafter, all of which contribute to produce a simple and efficient process for adjusting measuring machines.

In the drawing which fully illustrates a measuring machine of the type referred to, Figure 1 is a perspective.

Various factors, principally slight differences in the diameter of the rolls commercially used, differences in the thickness of paper or cloth used for making the charts, affect the movement of the chart as actuated from the measuring roll, so that heretofore it has been found impracticable to make use of the chart directly as a measuring device, and it has served for purposes of price computing only, and a separate measuring device has been required.

These difficulties are obviated by my invention and the chart is made to serve directly as a measuring device.

One way of carrying out my invention is by the provision of a shim preferably of paper on the chart roller, which may be made of the proper size to compensate for any inaccuracies in measurement, such as caused by variation in thickness of paper or by variation in the diameter of the roller, etc. The shim may conveniently be made a continuation of the chart itself and rolled up with the chart on the roller. If upon actual test with a measured piece of cloth, the chart is found to overindicate, it is removed from the roll and a section of the paper shim is cut off and the chart retested for measurement, and this is repeated until the indication obtained is substantially accurate. Thus the particular chart is fitted to the particular machine and roll and the computing chart made to serve as a measurement indicator, both simplifying the apparatus and the manner of its use.

The invention may be carried out by apparatus such as shown in the drawings in which Fig. 1 is a perspective view, partly in section, of a chart on its rollers and provided with a shim which is too long, giving a plus, or over indication, and Fig. 2 is a similar view, with a part of the shim cut off and giving a substantially correct measurement indication. Fig. 3 is a fragmentary plan view showing the use of the chart for measurement and for price computation. Fig. 4 is a section on line 4—4, Fig. 5. Fig. 5 is a section on line 5—5, Fig. 4. Fig. 6 is a detail view of a roll operating device. Fig. 7 is a section on line 7—7, Fig. 8. Fig. 8 is a section on line 8—8, Fig. 7. Fig. 9 is a diagrammatical plan view of a chart and the rollers therefor, and Fig. 10 is a longitudinal sectional view of the winding up roller for the chart.

The apparatus by means of which the present method or process may be practiced is covered in my co-pending application, Ser. No. 347,867, entitled Cloth metering chart and roller therefor, filed December 27, 1919.

In practicing my process, the diameter of the take-up roller at the start, that is to say, the actual diameter of the take-up spool or roller should be so small, that when the chart is wrapped upon it in the regular way the machine would have an inherent minus error in its indications, that is to say, the machine would indicate less than the actual length of the piece of fabric measured, but this error should be slight. With a roller of such a diameter, I employ a filler placed between the roller and the chart to give the roller the necessary effective diameter. In doing this I proceed to wrap the chart upon the roller and I simultaneously wrap upon the roller a thin flexible strip which is disposed between the roller and the chart, and may be between the layers of the chart as it winds upon the take-up roller. I continue this winding operation until it is certain that if the flexible strip were cut off, the machine would certainly have an inherent plus error in its indications. Having cut off the strip at such a point, I observe the character of the indications and determine approximately the degree of error in the indications. I then partially unwind the chart from the take-up roller until the end of the flexible strip is exposed; and remove a small portion of the end of the strip; I then rewind the chart on the measuring roller and again observe the indications. If the indications are then correct, the machine is passed as perfect in its indications. If, however, the machine still indicates a slight error, I repeat the operation just described, of removing another small portion at the end of the flexible strip. In this way, by repeating this process if necessary, a sufficient portion of the strip will eventually be removed to insure accuracy in the indications of the machine.

I shall now describe in detail a type of machine referred to, and explain my process specifically.

Reference character 10 designates the chart, and 11, the roll on which the chart is wound and by which the chart is operated for making measurements. Roll 11 is hollow and is provided with slot 12, through which chart 10 passes. Within roll 11 and fixed thereto to turn therewith is the shaft 13. Chart 10 is provided with a looped portion 14, which is slipped over shaft 13, as the chart is inserted in slot 12. This is a simple way to form the shim or strip 15 as a prolongation of chart 10 beyond the looped portion 14 as shown in Figs. 1 and 2 and if desired the strip or shim may conveniently be somewhat narrower than chart 10, as shown in Fig. 10, though it is not essential that the shim be so narrowed. In Fig. 2, shim 15, is shown of the correct length to secure substantially accurate measurement, whereas shim 15' in Fig. 1 is too long, and must be cut off somewhat to adapt the particular chart to the particular roll.

Roll 11 is operated from the goods being measured. In the form shown the roll shaft 11 has a gear 16 thereon, which meshes with pinion 17 that is rigid with gear 18. Gear 18 meshes with pinion 19 on the shaft 20' of the measuring roller 20, which preferably has a knurled surface to prevent rotation relative to the fabric 21 being measured. The strip of fabric 21 is held against measuring roller 20 by the spring pressed pressure roller 22, which is manually operated by the handle 23, when it is to be temporarily separated from roller 20 to permit roller 20 to turn backward or to permit insertion of cloth to be measured. It will be seen that the chart roll 11, being positively connected to measuring roller 20 by a gear train, is always rotated to the same extent by a given rotation of roller 20 as the latter turns with the goods, and roll 11 is therefore adapted to be used in making measurements of the cloth as well as the roll 20 itself. Roll 11 turns more slowly than roll 20, preferably making but one-fourth the number of rotations of roll 20. This is desirable because it permits the use of a shorter chart than could otherwise be used.

The other end of the chart is rolled on the enlarged hollow roller 24 operating as a supply roller carrying the chart, and controlled substantially like a shade roller by spring 25. The end of the chart 10 is brought in through slot 26 and out through slot 27 to obtain a convenient attachment to the roller 24. Roller 24, however, serves only for rolling up the chart 10; and keeping it taut or firmly wound on roll 11. Centrifugal brake arms 24' are provided on one end of roller 20 (see Figs. 7 and 8) for slowing down the rotation of roller 20. They fly out against a fixed head or bracket c' under actuation of spring 25 which takes place when the chart is returning to zero after the measuring roller is released by handle 23. This prevents "racing" in the returning movement.

The subdivisions on the scale 10 are progressively longer on account of the constantly increased diameter of roll 11 by the successive turns of the chart 10, as it is wound thereon. For example, the distance from the 2⅛ yard subdivision, marked 28 in Fig. 3, to the next higher subdivision for 2¼ yards marked 29, is slightly less than the distance from subdivision 29 to the 2⅜ yard subdivision marked 30.

At each subdivision the chart 10 is preferably marked with a series of sums in dollars and cents, as indicated at 31, Fig. 3, giving the total value of the corresponding length of material at prices per yard marked at 32 on the sides of the window 33 in the machine casing C. An arrow, pointer, or mark 32 is placed at the middle of window 33 to serve as a reference point or mark in making measurements by the use of chart 10. Roll 11 is preferably provided with adjustable means for stopping its rotation in each direction so that it may be stopped at the limit of a measuring movement when the chart has been wound up on roll 11 and also when the zero point of the scale lies substantially opposite the arrow 34. In the apparatus shown shaft 13 is provided with a worm 35 which engages a worm wheel 36 having its teeth interrupted at 37. Worm 35 is provided with stops 38 and 39 which stop the rotation of roll 11 by engaging with the bridged or interrupted part 37 of worm wheel 36 on opposite sides thereof. For one end of the chart it is sufficient that it be unwound so that all the subdivisions thereon will pass the arrow 34 before the movement of the roll and chart is stopped. The adjustment for the zero position can be readily accomplished by adjustment of the worm 35 on shaft 13 by means of the set screw 40.

The roll 11 is preferably closed at its end by the removable cap 41. Measuring roller 20 preferably has a flange 42 extending over the bearing member 43 to protect its shaft 20' from getting threads and ravelings wound thereon.

The machine casing C preferably is supported upon a post 44, which can be held at various heights in a slide or carriage 45, as by a ball 46 being spring thrust into sockets 47. The post 44 and the machine carried thereby are prevented from turning by means of the shouldered screw 48 entering slot 49 in the post. Carriage 45 preferably has a slide way 50 in which slide bar 51 fixed to the table or counter 52 is received, thereby providing for the convenient use of the apparatus at any point along the counter.

In carrying out the process, a chart is provided having a shim preferably connected thereto, and the same is put in place on the chart roll with the shim wound on the roll along with the chart, as shown in Figs. 1 and 2, and the other end of the chart is connected to roll 24.

The machine is set at zero. A measured piece of goods is then inserted and drawn through the apparatus, the end thereof being started at the edge L' of ledge L when the scale shows the zero mark opposite arrow 34. As the measured piece of cloth is drawn past the edge L', the correspondence between the subdivisions thereof and corresponding numbers appearing on the chart opposite the arrow is noted. The reading of the machine is then observed, and it is adjusted as described above. The worm 35 may also require adjustment. With the apparatus set to zero and properly adjusted, measurements are made by putting the goods, as cloth, ribbon, etc., to be measured, through the machine, and reading the indication at the arrow 34 on the chart. The value at various prices per yard may also be displayed alongside the length-indicating numbers, on the chart, so that the machine will indicate the charge to be made to the customer.

My invention may be applied to advantage in the practical construction of measuring machines, not only where there is an individual variation in the diameter of the take-up rolls, but it may also be applied to advantage where the diameters of the take-up rolls are uniform, but slightly greater or less than they should be. In case all the diameters are uniform as suggested, it then is merely necessary to employ a flexible strip or shim of a predetermined length, such as will give the take-up roller a virtual or effective diameter which is desired when the flexible strip winds upon the take-up roller. It will be evident that the length of this strip will affect the virtual diameter of the take-up roller. In this way take-up rollers of too small diameter can be utilized without difficulty, and if they are of uniform diameter no tearing off or reducing of the length of the flexible strip is necessary except to effect the adjustment of one roller; the adjustment of one roller will determine the length that is to be detached.

I claim:

1. In the process of adjusting the size of a roll formed by rolling a measurement chart past a reference mark and upon a roller, the steps which consist in winding a shim within the roll and shortening the size of the shim until substantially correct measurement indications are obtained.

2. The process of adjusting a measuring machine having a take-up roller and an indicating chart adapted to wind thereupon, which consists in winding the chart onto the take-up roller and simultaneously winding a thin flexible strip onto the take-up roller, said strip being regulated as to length so as to give the roller the desired effective diameter.

3. The process of adjusting a measuring machine, having a take-up roller and an indicating chart adapted to wind thereupon, which consists in winding the chart and a flexible strip simultaneously onto the take-up roller with the flexible strip disposed between the layers of the chart, terminating the winding of the chart and strip at a point which will cause the machine to have a plus error in its indication, observing the indication to ascertain the amount of the said error, partially unwinding the chart, and removing a sufficiently large portion of the end of the flexible strip to correct said error.

4. In a measuring machine having a take-up roller operated by the goods measured and an indicating chart adapted to be wound thereon, the process of adjusting the variable diameter of the take-up roller with the chart wound thereon to cause the calibrations of the chart to indicate exact measurement, which consists in introducing between the chart and the roller a filler continuous in extent and capable of being wound with the chart and of a length such as to cause the progressive diameter of the rolled chart to produce an accurate movement of the chart in exact proportion to the movement of the goods measured and relative to the calibrations of the chart.

In testimony that I claim the foregoing, I hereto set my hand, this 8th day of December, 1919.

JOHANNES TH. PEDERSÉN.